United States Patent [19]

Balfanz

[11] 4,316,076
[45] Feb. 16, 1982

[54] AUTOMATIC SPEED CONTROL FOR SEAM WELDING

[75] Inventor: Fredrick J. Balfanz, Waukesha, Wis.

[73] Assignee: C-R-O, Inc., Menomonee Falls, Wis.

[21] Appl. No.: 102,521

[22] Filed: Dec. 31, 1979

[51] Int. Cl.³ .............................................. B23K 9/12
[52] U.S. Cl. ............................ 219/124.34; 219/124.32
[58] Field of Search ...................... 219/124.34, 137.71, 219/124.22, 124.32

[56] References Cited

U.S. PATENT DOCUMENTS

| | | | |
|---|---|---|---|
| 2,719,899 | 10/1955 | Schwarting | 219/124.22 |
| 3,612,818 | 10/1971 | Bechtle et al. | 219/137.71 |
| 3,855,446 | 12/1974 | Kotova et al. | 219/137.71 |
| 3,924,094 | 12/1975 | Hansen et al. | 219/124.34 |

FOREIGN PATENT DOCUMENTS 77394  10/1970  Fed. Rep. of Germany ...................... 219/124.34

*Primary Examiner*—C. C. Shaw
*Attorney, Agent, or Firm*—Andrus, Sceales, Starke & Sawall

[57] ABSTRACT

A welding machine for use in connection with seam welding a pair of metal parts which are positioned to form a welding groove, and wherein the groove width undesirably varies at random due to improper part positioning or deviations from desired tolerance. The weld head is moved along the groove by a drive motor and is preceeded by a pair of fixedly connected sensing probes. The primary probe follows the groove wall portion of one of the parts, while an auxiliary probe follows a surface on the other part. Variations in groove width cause variations in the distance between the two probe tips, said latter variations being utilized to automatically change the speed of the weld head drive motor.

8 Claims, 5 Drawing Figures

AUTOMATIC SPEED CONTROL FOR SEAM WELDING

BACKGROUND AND SUMMARY OF THE INVENTION

This invention relates to an automatic speed control for seam welding.

Welding machines which utilize either manual setting or a programming device, such as an N/C or tracer control, for directing the welding head along a predetermined path at a set speed, have long been in use. The machines have been used to manufacture relatively large parts such as booms, C-frames and the like, which may include not only straight line segments but also contoured segments.

Many such known welding machines include a transverse beam or bridge which defines a transverse or X axis and which is movable along rails or the like which define a longitudinal or Y axis. A carriage mounted for movement along the bridge carries a metal working tool, such as a welding head or the like.

It is known to mount a sensing means such as a probe adjacent and in advance of the welding head for the purpose of sensing the position of the groove or seam for welding.

Reference is made to copending U.S. patent application Ser. No. 24,696, filed Mar. 28, 1979, entitled "Programmed Welding Machine With Continuously Monitored Override Control" and assigned to the same assignee, for a further explanation of such types of machines.

In the manufacture of C-frames and the like, it is necessary to seam weld a pair of parts together along a groove. The parts are suitably positioned prior to welding, and at least in some instances may be tack welded together to hold them in place. Due to the peculiarities of certain metal parts which are to be assembled by welding, and/or due to irregularities in tack welding and the like, the groove width may not be uniform and may vary randomly throughout its length.

In seam welding using a wire electrode fed at a constant rate, the machine is normally set (either manually or by a suitable program) so that the weld head traverses the groove at a constant speed commensurate with obtaining an adequate weld bead which will firmly join the two metal members. However, if the groove should widen or narrow during this operation, and if the weld head speed remains constant, the quality of the weld will be compromised. With too wide a groove, the bead will not fill the gap and a weak joint will be formed. With too narrow a groove, the weld material will undesirably overflow.

Because each pair of workpieces to be joined are different from any other pair, and because of variations in each tack weld set-up, changes in weld head speed cannot be pre-programmed into the control unit to compensate for random groove width variations. Heretofore, such speed changes have had to be made manually by an operator who had to determine by visual observation the groove width variations.

The invention is particularly adapted for use in connection with welding a pair of metal parts which are positioned to form the welding groove, wherein the positioning is inaccurate and/or one of the parts is uniformly within the desired tolerances and the other part is not.

It is a task of the invention that, when the two parts to be welded are improperly mounted to thereby create a groove of undesirably varying random width, a surface on at least one of the parts is utilized to provide measurement of the groove width deviation.

It is a further task of the invention that, regardless of whether the part positioning is proper or not, when one of the two parts to be welded is uniformly within the desired tolerances and the other part is not, or when both parts are not within the desired tolerances, a surface on at least one of the parts is used in providing the measurement of the groove width deviation.

It is yet another task of the present invention to provide a device which automatically measures random changes in the width of a groove to be seam welded, and which compensates for such changes by changing the speed of the weld head drive mechanism.

It is a further task of the present invention to utilize the main groove position sensing probe and/or an auxiliary sensing device in carrying out the functions of the automatic device.

In accordance with one aspect of the invention, primary and auxiliary sensing probes are provided with the primary probe adapted to lead and control the position of the welding head in its traversing of the groove. The probes are fixedly connected together, with the primary probe adapted to follow a wall of the weld groove formed in one part while the auxiliary probe is adapted to separately engage a surface on the other part.

In accordance with another aspect of the invention, a deviation in the groove width caused by undesirable random variations in said weld groove wall causes the primary probe to move the mounting of the auxiliary probe, thereby creating output signals to change the speed of the weld head drive motor.

In accordance with an additional aspect of the invention, a deviation in groove width caused by an undesirable random variation in the said surface of the other part also causes the auxiliary probe to create an output signal to change the speed of the weld head drive motor.

In accordance with a further aspect of the invention, the primary probe is loaded against the groove wall by electrical balancing circuitry, while the auxiliary probe is mechanically loaded into the said surface of the other part and is responsive to positional changes between its tip and its housing to provide an output signal for changing the drive motor speed.

The result is that the width of the weld groove has been automatically and continuously monitored and compensated for.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
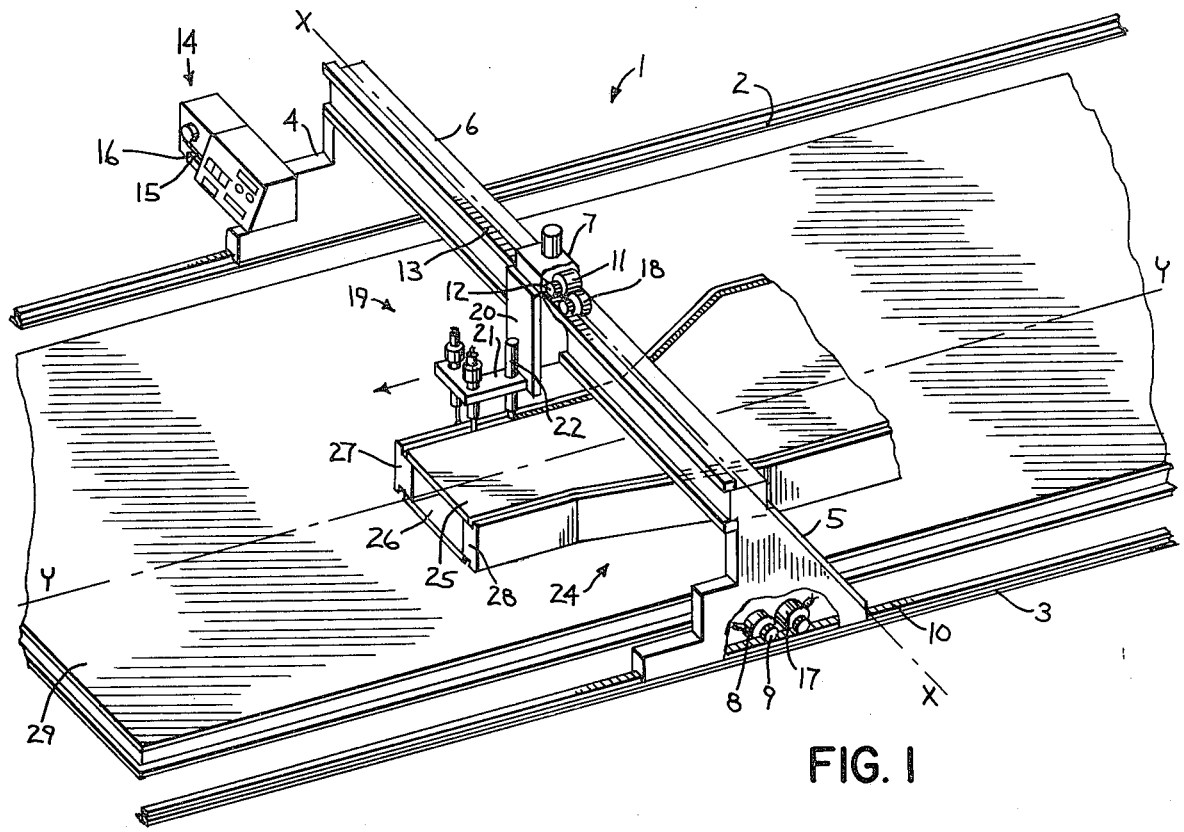
FIG. 1 is a perspective view of a seam welding machine adapted to incorporate the various concepts of the invention.

The preferred embodiment incorporating the concepts of the invention is illustrated generally in FIG. 1 wherein a welding machine 1 includes a frame-like network of main parts and is adapted to be mounted on a pair of longitudinal parallel rails 2 and 3 which are secured to the floor. Support gantries 4 and 5 are mounted for movement along the respective rails, with the gantries supporting the ends of a transverse support or bridge 6 which extends over the welding area. A carriage 7 is suitably mounted for movement along bridge 6.

Bridge 6 defines a main horizontal X axis, while rails 2 and 3 are parallel to a main horizontal Y axis, for purposes of reference.

Bridge 6 is adapted to be driven along the Y axis by any suitable motive means, such as motor 8 which is mounted in gantry 5 and which has a pinion 9 which meshes with a rack 10 disposed along rail 3. A corresponding motor, not shown, may also be disposed along rail 2. Similarly, carriage 7 is adapted to be driven along the X axis by any suitable motive means such as a motor 11 on carriage 7 and which has a pinion 12 which meshes with a rack 13 disposed on the bridge.

A device is provided to control the operation of motors 8 and 11, as well as other desired elements in the usual well-known manner. While in this instance the control could be manual, it is contemplated that a programmable control, such as N/C, would be preferable. See the above-identified co-pending application and patents referred to therein.

In the present embodiment, an input control unit 14 is used to program and operate numerical control equipment, which includes paper or magnetic tape 15 which passes through the usual pickup head section 16 to create an output for driving the aforesaid motors at a speed and in the direction desired to create a programmed path for the carriage.

Suitable feedback devices 17, 18 for motors 8 and 11 may be gearingly connected to racks 10 and 13 respectively and connected to control unit 14 in the usual manner.

Figure 2:
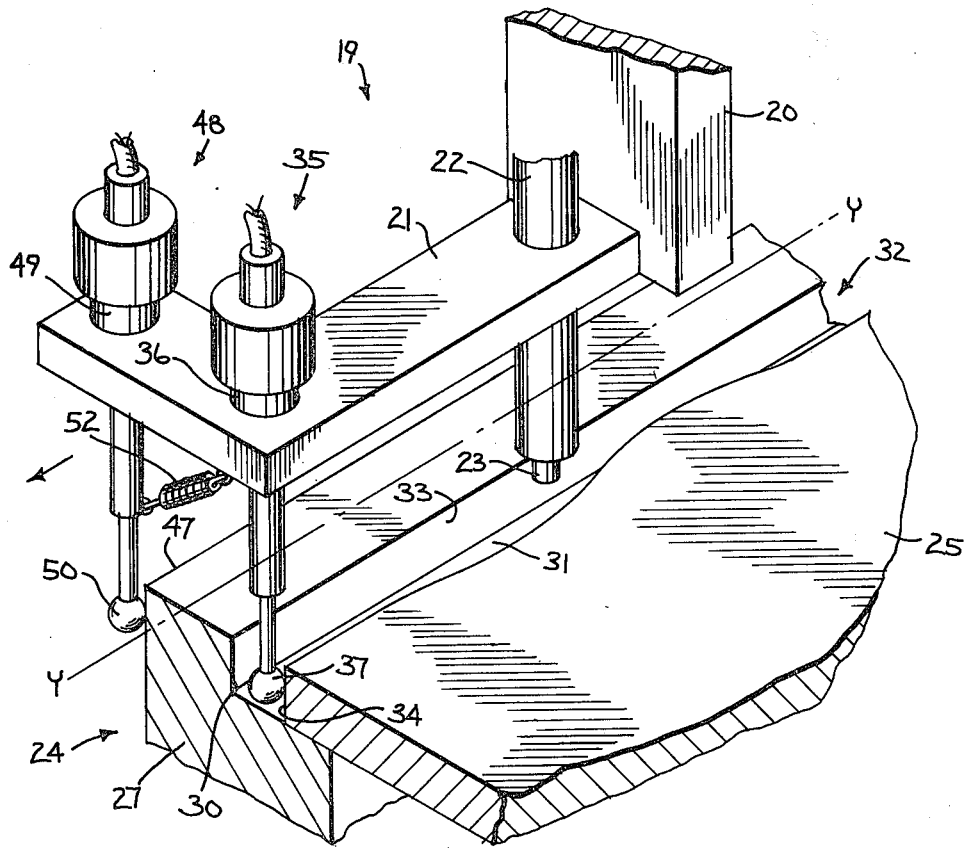
FIG. 2 is an enlarged fragmentary perspective view of the welding assembly in the process of making a seam weld, with parts removed for clarity.

Referring to FIGS. 1 and 2, carriage 7 is adapted to mount a welding assembly 19. For this purpose, a bracket 20 depends downwardly from carriage 7, and a forwardly extending plate-like support 21 is secured to the lower portion of the bracket. A vertical weld head 22 having a tip 23 is mounted to the inner end portion of support 21 and may be supplied with welding wire, not shown, from any suitable source.

Weld head 22 is adapted to join a pair of metal workpieces into a unitary assembly. Numerous types of assemblies are, of course, formable in this manner. In the present instance, an engine mount 24 is to be created and comprises upper and lower horizontal plates 25, 26, the edges of which are joined by elongated form sections 27, 28.

Plates 25, 26 and sections 27, 28 are initially separate pieces, each being separately manufactured. Usually, plates 25, 26 have been flame cut to the desired shape, while form sections 27, 28 have been extruded or the like. It is possible that one or more of these parts may deviate from the actual desired contour. For example, plates 25, 26 may deviate due to wide tolerances inherent in the flame cutting process. Form sections 27, 28 may deviate due to improper treatment either during or after extrusion.

Regardless of whether or not the elements 25-28 are uniformly within the desired tolerances, another source of difficulty is the possible imprecise positioning of a plate and form section for welding. Thus, and for example, plate 25 may be precisely positioned while form section 27 is not; or vice versa.

In all such cases, the width of the groove therebetween will not be uniform.

The following illustrative description assumes that the plate edges are imprecise while the form section parts have outer surfaces which are within very close tolerances and closely approach their designed dimensions.

It will be assumed that plate 26 has already been joined to sections 27, 28 by welding and that the partial assembly has been turned over and rests on a suitable platform 29, as shown in FIG. 1. It is next desired to weld plate 25 to sections 27, 28. Referring to FIG. 2, the construction is such that form section 27 is provided with an internal shoulder 30 forming a support ledge 31 upon which the longitudinal edge portion of plate 25 rests.

Plate 25 is spaced inwardly from section 27 to form a three-sided weld groove 32 having a floor formed by ledge 31, an outer side wall or surface 33 formed by form 27, and an inner side wall 34 formed by the edge of plate 25.

As is the usual practice, and especially if groove 32 is contoured along part of its length as shown in FIG. 1, a vertical sensing probe 35 having a main housing 36 and spring centered tip 37 is fixedly mounted to the outer end portion of support 21. When welding is to proceed parallel to the Y axis, and upon actuation of motor 8, probe 35 generally will proceed in advance of weld head 22 and cause the latter to follow any changes in basic contour of groove 32 by actuating motor 11 in the usual well-known manner.

Figure 4:
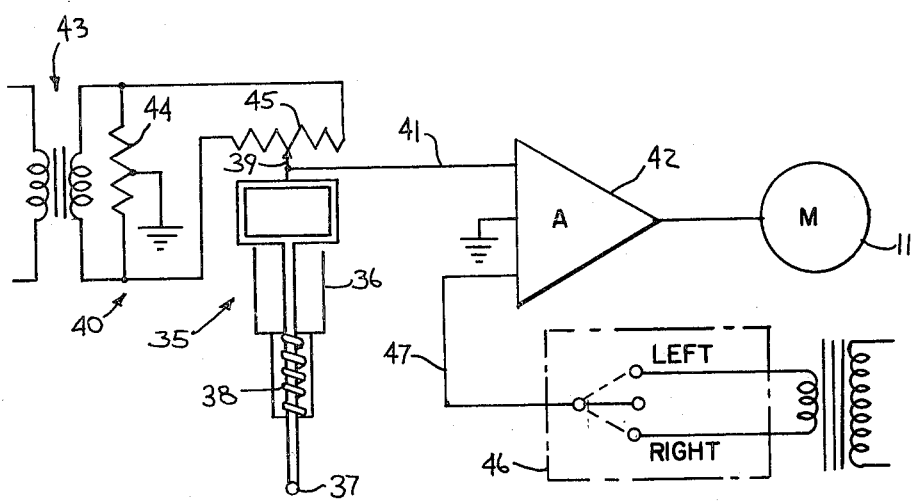
FIG. 4 is a schematic circuit diagram for loading of the primary or first probe, and showing the transverse positional control motor.

To assure that probe 35 properly follows groove 32, tip 37 is electrically preloaded against groove inner wall 34, i.e., the edge of plate 25. For this purpose, and referring to FIG. 4, probe tip 37 is biased toward a central position, as by a spring 38. The probe output feeds through a line 39 to a bridge circuit 40 which in turn is connected through an input line 41 to a null-type amplifier 42 connected to motor 11. Bridge circuit 40 includes a power supply transformer 43 and a pair of variable resistors 44 and 45 connected in parallel. When the variable resistors are in normal balance, no signal is fed to amplifier 42 or motor 11. However, under some circumstances, as with a change in the general direction of groove 32, probe 35 will cause the resistors and bridge circuit to become unbalanced, thereby causing a signal to be fed to amplifier 42, and hence to motor 11. Motor 11 will continue to operate until the circuit is again balanced.

The aforementioned electrical preload is created by providing a manually operable preload switch 46 of any suitable well-known type and which is connected to a source of power. The switch output is connected through a line 47 to provide a second or supplemental input to amplifier 42. By suitably adjusting the output voltage of switch 46, amplifier 42 can be made to actuate motor 11, just as if bridge circuit 40 was unbalanced. As soon as motor 11 starts operating in the desired direction, carriage 7 will be caused to move to drive probe tip 37 into wall 34. This will unbalance bridge circuit 40 and feed a second signal through amplifier 42 and the process will continue until circuit 40 is again balanced. At this point, an artificial null will have been created with probe tip 37 in loaded engagement with groove wall 34.

As heretofore discussed, if groove 32 was of uniform normal width throughout its length, and with a proper constant weld wire feed rate, a high quality weld could be made by operating the weld head drive motor 8, in this instance, at a constant speed. However, and in this example, due to the random irregularities of edge 34, in reality groove 32 will be variable in width. A constant weld speed is therefore undesirable.

It is an aspect of the invention that during traverse of groove 32, its width is automatically and continuously monitored, and that the speed of the weld head drive is automatically and continuously adjusted so that the proper amount of weld wire will be provided at the seam, depending upon the groove width at any given point. In the present example, this is accomplished by utilizing the uniform dimensions of the closely adjacent form section, such as 27 in FIG. 2. In the present embodiment, the uniform outer surface comprising face 47 (FIGS. 2 and 3) is used. Face 47 is disposed exteriorly of groove 32 and is parallel to the central groove axis and to the basic desired direction of extent of inner groove wall 34. Face 47 is also spaced from and faces in the same direction as wall 34.

Figure 5:
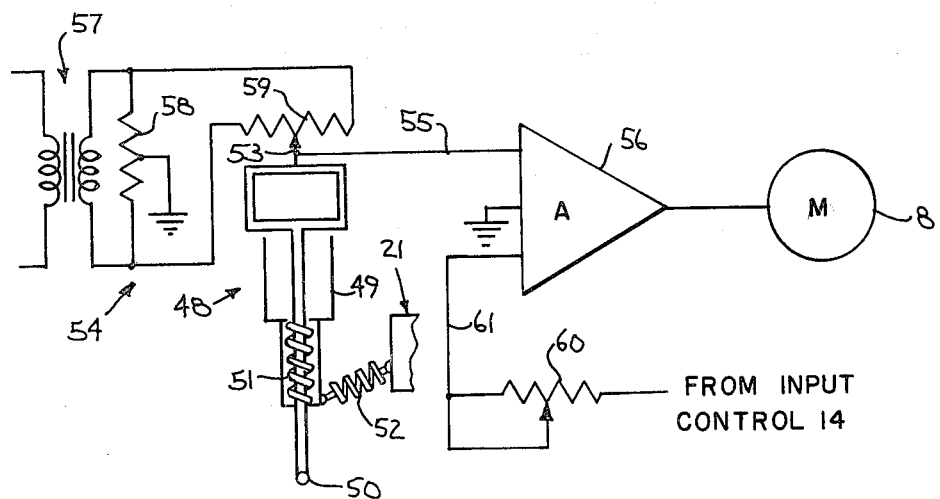
FIG. 5 is a schematic circuit diagram involving the auxiliary or second probe, and showing the motor for driving the weld head along the groove.

As shown, a second or auxiliary sensing probe 48 having a housing 49 and tip 50 is fixedly secured to a laterally offset portion of support 21. Probe 48 is disposed generally over face 47. To accommodate workpieces of different dimensions, probes 35 and 48 may be made adjustable relative to each other, and lockable to support 21. Referring to FIG. 5, probe 48 also may have a spring 51 to center tip 50, but the latter may hang freely if desired. Furthermore, probe tip 50 is preloaded against face 47, preferably mechanically such as by a lateral spring 52 shown schematically in FIGS. 2 and 5. In the start position, tip 50 should be just touching face 47 and not biased off of center relative to its housing 49.

As with primary probe 35, the output of auxiliary probe 48 feeds through a line 53 to a bridge circuit 54 which in turn is connected through an input line 55 to a null-type amplifier 56 connected to motor 8. Bridge circuit 54 includes a power supply transformer 57 and a pair of variable resistors 58 and 59 connected in parallel. When the variable resistors are in normal balance, as when probe tip 50 is not biased off of center, no signal is fed to amplifier 56 or motor 8. However, and as will be described, shifting of tip 50 off center in a direction normal to face 47 will unbalance the related bridge circuit and cause a signal to be fed to amplifier 56 to thereby change the drive speed of motor 8.

An additional input is provided to amplifier 56 for purposes of controlling the main speed of motor 8. For this purpose, a further variable resistor 60 is connected at one end to the output of the programmable control 14 (or may be manually actuated), and is connected through a line 61 which forms the second amplifier input.

Figure 3:
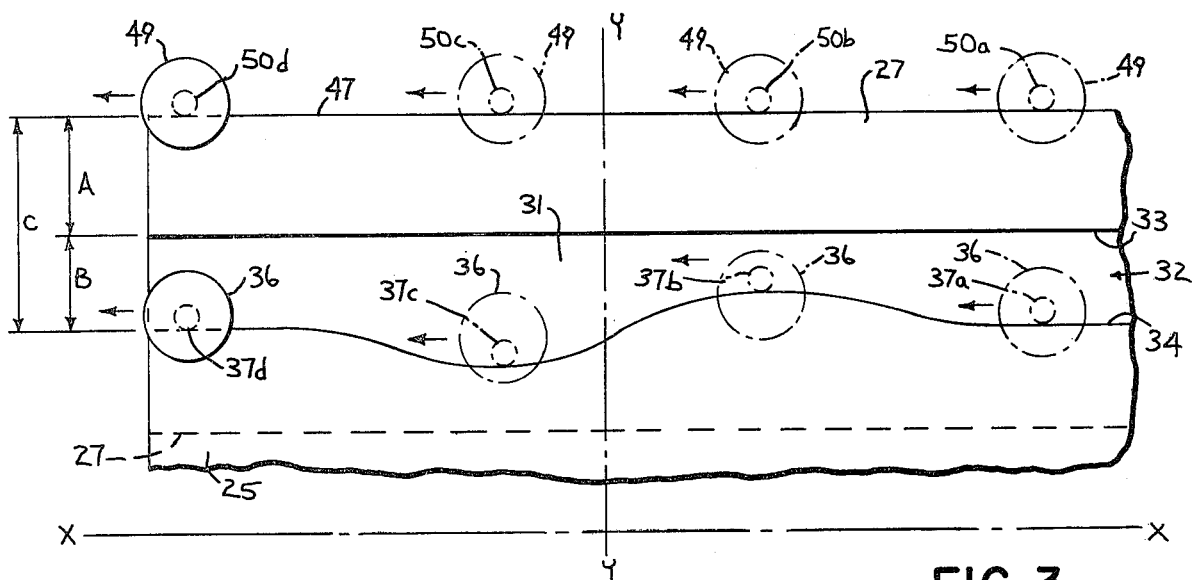
FIG. 3 is a top plan schematic view showing the distance relationships, and possible variations, between the probes during welding.

Referring now to FIG. 3, it is to be recalled that plate 25 is dimensionally variable and has a variable groove wall or edge 34. Form section 27 is dimensionally uniform and thus has uniform surfaces including groove wall 33 and an outer face 47 parallel to the latter wall. The distance between wall 33 and face 47 is considered uniform along the length of groove 32, and is designated as A. The distance between wall 33 and wall 34 (the groove width) is variable along the length of the groove 32, and is designated as B. Likewise, the distance between wall 34 and face 47 is also variable along the length of the groove and in correspondence to the random deviation in groove width, and is designated as C. The relationships are such that B=C−A. Since A is a constant, a measurement of C will provide an indication of the deviation in B. The structure previously described will perform the task of automatically and continuously measuring C, and then compensate for the random deviations from normal to change the speed of the weld head drive motor 8.

FIG. 3 schematically illustrates the traversing of a groove 32 by the device of FIGS. 1 and 2, in a direction from right to left. Groove 32 is shown as starting at a normal width, for which the drive motor speed is constant and preset, with subsequent narrowing and widening of the groove, until the normal width occurs again at the left end.

As the welding begins along the normal portion of the groove, probe tips 37a and 50a are loaded against wall 34 and face 47 respectively. Motor 8 is operating at the preselected constant normal speed and bridge circuits 40 and 54 are effectively balanced. Weld head 22 is, of course, following behind, its main position control being probe 35.

As the two probe tips reach the restriction caused by an upward deviation in wall 34, probe tip 37b will be shifted laterally toward face 47 in such a way that bridge circuit 40 will become unbalanced, so that the primary input 41 to amplifier 42 will create a signal to actuate motor 11 to thereby drive carriage 7 along the X axis in an upwardly direction as viewed in FIG. 3. Since probe 48 is effectively ganged to probe 35 through support plate 21, probe 48 including housing 49 will also shift away from face 47. Probe tip 50b will continue to follow uniform face 47 because of the bias of spring 52, but the probe mechanism will now be tilted off center relative to its housing 49. This unbalances bridge circuit 54, feeding a signal to amplifier 56 and motor 8 to cause the latter to increase in speed. The two inputs to amplifier 56 are properly summed in the usual manner. The effect is to lay down less weld wire in the restricted portion of the groove, with weld head 22 traversing this portion at a faster velocity.

As welding continues, the two probe tips gradually approach a widening of the groove beyond normal, and probe tip 37c will be shifted laterally in the opposite direction away from face 47. Again, bridge circuit 40 will become unbalanced, but electrically opposite to the above-described unbalance, the ultimate result being that motor 11 will drive carriage 7 downwardly as viewed in FIG. 3. Probe 48 and housing 49 will now be carried toward face 47 and even overlap form section 27, with probe tip 50c continuing to follow face 47. The probe mechanism will again tilt off center, but oppositely from before. The unbalanced bridge circuit 54 will, by summing of signals in amplifier 56, cause motor 8 to decrease in speed. The ultimate effect is to lay down more weld wire in that wider portion of the groove, with weld head 22 traversing this portion at a slower velocity.

At the end of the welding cycle, groove 32 returns to normal width with probe tips 37d and 50d positioned to cause balanced bridge circuits, as at the start of the example.

As previously indicated, the situation may arise wherein it is plate 25 that is dimensionally within tolerances, while form section 27 is not. In this instance, as primary probe tip 37 follows groove side wall 34 to properly position weld head 22, there will be no deviation to cause support 21 to shift and unbalance auxiliary probe 48. However, when spring loaded auxiliary probe tip 50 encounters a deviation in form section surface 47, the tip will go off center relative to its housing 49. The effect is basically the same as if support 21 had shifted to tilt tip 50. The end result is the same, that is, probe 48 will be electrically unbalanced to thereby change the speed of weld head drive motor 8.

A further situation arises when, and even though the parts to be welded may all be within their design tolerances, the parts are improperly positioned relative to each other. Thus, if form section 27 is properly positioned and plate 25 is askew, the system will operate in a manner similar to that illustrated in the drawings, as if the wall 34 of plate 25 was not within tolerances. Likewise, and in the reverse situation, the system will operate in a manner similar to that described in the paragraph directly above.

In all cases, the concept of the invention relies on the fact that dimension A as shown in FIG. 3 is constant. If the form section is out of tolerance, due to bending or the like, it must be assumed that the distance A nevertheless remains the same.

While the drawings appear to show weld head tip 23 spaced substantially from probe tip 37, this is for illustrative purposes only. In reality, these tips would be disposed very closely adjacent each other in accordance with normal practice. Furthermore, the groove width deviations have been exaggerated in the drawings for purposes of clarity, and would normally be more gradual.

While the operation of the device of the invention has been described in relation to a generally straight-line groove parallel to one of the machine axes, the concepts will work equally well with grooves of differently oriented and changing basic configurations. With changing configurations, a rotator of the type disclosed in the previously identified co-pending application may be necessary. Furthermore, multiple sets of motors and other controls often included in such welding machines may be utilized without departing from the spirit of the invention.

Various modes of carrying out the invention are contemplated as being within the scope of the following claims, particularly pointing out and distinctly claiming the subject matter which is regarded as the invention.

I claim:

1. In a welding machine for joining first and second metal parts positioned to form a weld groove therebetween and wherein the groove randomly deviates in width from the desired uniform width, the combination comprising:
   (a) a machine frame,
   (b) a carriage mounted to said frame,
   (c) a weld head suspended from said carriage for traversing said groove,
   (d) motive means to drive said carriage and weld head at a given speed relative to said groove,
   (e) control means suspended from said carriage in advance of said weld head and connected for movement with the latter and responsive to the said random deviations in groove width to automatically change the drive speed of said motive means in accordance with said deviations,
   (f) said control means including first and second sensors engageable separately with each of said first and second metal parts,
   (g) said first sensor being disposed to engagingly follow a wall of said groove formed by said first metal part, and with said first sensor being disposed in advance of and connected to said weld head,
   (h) position control means responsive to said first sensor for controlling the position of said weld head during traverse of the groove by said head,
   (i) said second sensor being disposed to engagingly follow a surface of said second metal part exteriorly of said groove, said second sensor having a portion fixedly connected to a portion of said first sensor,
   (j) and speed control means responsive to said second sensor for controlling the drive speed of said motive means.

2. The welding machine of claim 1 wherein said speed control means is responsive to a change in position of said second sensor relative to said first sensor to change the speed of said motive means.

3. The welding machine of claim 1:
   (a) wherein said speed control means includes a balanceable bridge circuit connected between said second sensor and said motive means,
   (b) the construction being such that random deviations in said groove wall or said surface of said second part cause said bridge circuit to become unbalanced to thereby change the drive speed of said motive means.

4. In the welding machine of claim 3:
   (a) an amplifier connected between said bridge circuit and said motive means so that said amplifier has an input from said bridge circuit,
   (b) and means providing a second input to said amplifier to provide the said given speed of said travel via said motive means.

5. The welding machine of claim 4 wherein the inputs of said amplifier provide a combined amplifier output for controlling said motive means.

6. In the welding machine of claim 3: electrical circuit means for loading said first sensor against said groove wall.

7. The welding machine of claim 1 wherein:
   (a) said surface of said second part is spaced from and generally parallel to the direction of extent of said groove wall,
   (b) said second sensor is loaded against said surface,
   (c) said speed control means includes a control circuit disposed between said second sensor and said motive means,
   (d) and sensing of said random deviations by either of said sensors causes said second sensor to provide a speed changing signal to said control circuit and hence to said motive means.

8. In the welding machine of claim 7:
   (a) a support mounting said weld head, said first sensor and said second sensor,
   (b) and said position control means includes second motive means for moving said support generally laterally of said groove, said second motive means being responsive to the position of said first sensor to shift the position of said second sensor.

* * * * *